April 10, 1951 G. B. POLLOCK 2,548,172
STRIP METERING CONSTRUCTION
Filed March 16, 1946 3 Sheets-Sheet 1

INVENTOR.
Gordon B. Pollock
BY
ATTORNEY.

April 10, 1951  G. B. POLLOCK  2,548,172
STRIP METERING CONSTRUCTION
Filed March 16, 1946  3 Sheets-Sheet 2

INVENTOR.
Gordon B. Pollock
BY
ATTORNEY

April 10, 1951     G. B. POLLOCK     2,548,172
STRIP METERING CONSTRUCTION
Filed March 16, 1946     3 Sheets-Sheet 3

INVENTOR.
Gordon B. Pollock
BY
*Alfred W. Kiger*
ATTORNEY

Patented Apr. 10, 1951

2,548,172

UNITED STATES PATENT OFFICE 2,548,172

STRIP METERING CONSTRUCTION

Gordon B. Pollock, South Laguna, Calif.

Application March 16, 1946, Serial No. 654,895

15 Claims. (Cl. 242—71)

This invention relates broadly to means for handling a length of strip material, wherein such strip material is moved into successive longitudinal positions, particularly in connection with means for metering the movement of such strip into such successive longitudinal positions. More particularly, this invention relates to a feed control mechanism for use in a photographic camera or the like, employing a roll or strip of photographic film, and pertains particularly to a construction adapted to respond to the presence of the photographic film at the photographic aperture and provide for interruption of the manual advance of the roll film so as to meter the correct length of film advanced for each picture, while permitting free advance of the film through the camera up to the time that the first picture length is located in the camera aperture and after the last picture length has left the camera aperture in a completion of the winding operation carrying the roll film through the camera.

The construction of the present invention is adapted particularly for use in cameras in which a roll type film is employed, with or without an accompanying backing-strip of paper or the like. Where a backing-strip is employed as a light-sealing protective element as well as a carrier for the photographic emulsion member or film, the two strip-like members are wound concurrently about a roller or spool, and attached to one another at the leading end of the photographic emulsion member so that movement of the paper protective element through the camera also causes movement of the photographic emulsion member. In passing this roll film through the camera it is customary to unwind the free or "leader" end of the paper backing-strip, load the film in the camera and attach such leader to a take-up roll, which is rotated to produce the desired advancement of the film through the camera aperture. According to my invention, the presence of the photographic film-strip itself is utilized to cause actuation of the associated means for metering successive lengths of film through the camera, initiating such metering means when the film is present in the picture-taking aperture, maintaining the metering action of such metering means during such presence, and terminating the action of such metering means when such film has passed through the picture-taking aperture. Where the invention is applied to a construction adapted to utilize a film-strip provided with a protective backing-strip of paper or the like, both the backing-strip and the photosensitive strip are of appreciable thickness, and according to my invention this thickness, as well as the difference in thickness between the backing-strip plus the photosensitive strip, and the backing-strip itself, is utilized to control the initiation, maintenance, and termination of the operation of the metering aspects of the film-advancing mechanism.

The device of the present invention, in its forms applicable primarily to photographic camera use, belongs to that class of metering and measuring structures which depend upon a metering wheel, roller or sprocket driven by the movement of the film to cause locking of the film advancing and indication of the position of the film in the camera. A principal object of the invention is to provide a structure of the above type, wherein means are provided in spaced relationship to such metering wheel, roller or sprocket to define a passageway for transport of the film, whereby the metering wheel, roller or sprocket is caused to have a discriminatory action in respect to the material present in such passageway, to result in metering activity only when film is present in such passageway and inactivity when film is not present in such passageway.

The further principal object of this invention is to provide a metering mechanism in a device for moving a length of strip material of the given thickness into successive longitudinal positions, which is of very simple construction as compared with hitherto proposed structures of comparable function, dependable in operation, and adapted to production at a comparatively low cost.

A further object of the invention is to provide a device adapted for the movement of a strip of material in a longitudinal manner through successive longitudinal positions and for maintaining an indication of the number of such positions to which said strip has been moved, in which said means for indicating the number of such positions is automatically returned to zero when the strip of material has passed through the measuring zone, whereby the operator is advised of the completion of the travel of such strip through such measuring zone. In connection with this particular object, it is a further desirable feature of this invention to cause this movement of the indicating means to the original or zero position to provide a mechanical, visual, and audible signal to the operator that the aforesaid film travel has been completed.

One of the particular objects of the invention is to provide a metering mechanism adapted for use in "roll-film" cameras, and having a sensor device arranged to sense the thickness of the backing-strip or the backing-strip plus the photosensitive strip as present in the camera between the position of the feed roll and the take-up roll, such sensor means being adapted to cause operation of the film metering structure and thus secure the desired interruption of the film advancement as the required film-lengths are progressively advanced through the camera, only while both thicknesses of backing-strip and photosensitive strip are present adjacent such sensor means, the film advancing mechanism being adapted for free and continuous movement under control of the operator when only the film backing-strip alone is present at the position of such sensor means.

A further object of the invention is to provide a device of the character above set forth, which is adapted for operation on roll films of varied length without requiring advance mechanical adjustment or "pre-setting" of the device wherein the ability of the device to meter successive film-lengths or frames is limited only by the total indicating ability of the associated indicia or "counting" mechanism, so that full metering action is obtained whether a 6 exposure, 8 exposure, 12 exposure or other length of film is loaded in the camera device.

A further object of the invention is to provide a film metering construction for a roll film camera which enables the user to freely wind the film roll through the camera until the first picture frame is reached, at which time the film advancing means is interrupted and fixed against further rotation until the mechanism is manually released for the advance of a second frame, so on through the full number of frames available on the film-strip, after which the mechanism is released for free winding movement to completely wind the film roll through the camera and on to the take-up spool, without interruption, after the last film frame has left the picture aperture.

A further object of the invention, according to a preferred embodiment, is to provide a film feed control mechanism for roll film cameras in which a rotatable film-strip engaging element is positioned for engagement with the film-strip along a marginal edge portion thereof when both the backing-strip and the film-strip are concurrently present at a given position, which film-strip engaging member is adapted to be rotated by the advancing film-strip as it is carried through the camera under operation of the film advancing structure, and in which the rotation of this film-strip engaging member is employed to directly control the amount of film advanced for each picture frame, such control being exercised upon the film advancing means only while the film-strip is present adjacent this given position, so that the film advancing means may be freely operated during the time that the backing strip or lead end of the film roll is passed through the camera up to the time that the first film area is brought into position for photographic use, and for free operation thereof after the last film section has passed the photographic aperture. As a result thereof the operator has merely to effect operation of the film advancing means, in the complete camera loading and picture-taking operation, until the first frame is ready for photographic use, take his picture, release the mechanism and wind it again for the next picture frame, and so on until the last picture frame is removed from the picture aperture, after which the film advancing mechanism is freely rotated until the paper backing-strip and film-strip are completely wound upon the take-up spool, at which time the operation is completed.

A device of this invention may comprise, as applied to a structure for moving a length of strip material of a given thickness into successive longitudinal positions, guide means establishing a passage through which the strip is to be moved, together with a metering roller member located at the passage and positioned peripherally to engage the strip when it is present therein, and rotatable thereby in response to movement of the strip through the passage. The guide means are separated from the periphery of the roller member an amount not more than the given thickness of the strip material to define a passage portion through which the strip must move, and locking means may be provided in association with the means for moving the film through the passage to interrupt the movement of such strip at successive longitudinal positions thereof in response to rotation of the roller member through predetermined rotational amount. The structure further preferably comprises spring means biasing the roller member toward rotation in the direction opposite the direction of rotation thereof which is caused by engagement with the moving strip, whereby the roller member is caused to be returned and maintained in a given inoperative position or zero-indicating position upon passage of the strip out of the space between the guide means and the roller member.

The device of the present invention may further comprise the combination of a film advancing means for producing concurrent movement, through a camera, of a roll film having a backing-strip and a strip of photosensitive film material, such film advancing means including a rotatable element adapted for engagement with a film take-up spool to produce such movement, means defining a passage in the camera adapted to receive the backing and photosensitive strips during the travel thereof through the camera, a metering structure which includes a rotatable film-length metering member adapted to be engaged by one of said strips when both of said strips are present in the passage, together with detent means adapted for movement upon rotating movement of said rotatable film-length metering member an amount corresponding to a desired length of film travel through said passage into and out of a position engaging the rotatable element of the film advancing means for constraining the same against rotation after completion of said amount of rotating movement, together with count wheel means adapted to be rotatably advanced from a zero position through successive film-frame indicating positions by operation of the film-length metering member in response of the travel of said strip through the passage. The count wheel structure preferably includes spring means biasing the count wheel toward the zero position, and detent means are provided which are movable to position said count wheel in the respective successive film-frame indicating position upon advancement thereto, together with lever means operatively associated with the count wheel and the detent means operative (1) to move said detent into the position providing such constraint of said rotatable element when the count wheel is moved into the respective successive film-framing indicating positions and (2) to move said detent out of said position when said count wheel is in the zero position, and sensor means located adjacent the passage and responsive to the thickness of the material in said passage as represented by the thickness of the backing-strip plus the film-strip and adapted to constrain the count wheel against rotation towards the zero position under the action of the spring means, when both film-strips are present in the passage. According to a preferred embodiment of the invention, the rotatable metering member is positioned for direct engagement and rotation by one of the strips adjacent the location of the picture aperture in the camera, and spacer means are provided adjacent this rotatable metering member and adapted to engage the backing-strip when such strip is present at such picture aperture in the absence of the film-strip and constrain such backing-strip out of contact with the rotatable metering member, so that such metering member will be rotated only when both of the strips are present at such picture apertures.

Other features and objects of this invention will be brought out in the ensuing description of certain illustrative embodiments thereof, or will be apparent from such description. The accompanying drawings illustrate such embodiments, and referring thereto.

Referring to Figs. 1–9 of the drawings, a camera body is indicated at 1, provided with side walls 2 and 3 and a removable back 4. Means are provided to establish a "bellows" or shield, as at 5 and to define a film or picture aperture as at 6 which subtends the desired portion of the rearwardly directed angle of view of the photographic lens which will be provided for the camera (but not shown in the drawings). This aperture 6 is provided with lands 7 to guide the film through the camera from the feed roll to the take-up roll together with a pressure plate 8 which is adapted to crowd the film forwardly against the lands 7 through the agency of suitable springs 9 which may be mounted upon the camera back 4.

At one side wall of the camera the land 7 of the aperture 6 is cut away as at 11, and a metering wheel 12 is provided in such manner that the peripheral portion thereof is located in position to engage a film-strip present on the land 7. The metering wheel 12 is rotatably mounted on the side wall 3 as at 13 and an outboard pivotal support may be provided for the left-hand end of the wheel 12 as at 14, carried by a bracket 15 attached as at 16 to the side wall 3 (this bracket being omitted in Figs. 1 and 5). The aperture structure 6 is provided with a slot 17 at the position of the lands 7 through which the edge of the wheel 12 may extend to a level slightly beyond the level established by the lands 7. A spacer member 18, preferably formed of a thin spring steel or the like is disposed at the cut-away portion 11, preferably at both lateral sides of the slot 17, and is attached to the picture aperture structure 6 in any suitable manner, as by screw attachment 19. A strip locating member is provided against which the spacer member 18 may act, such as a backing plate 21 carried on a resilient supporting strip 22 mounted in a slot 23 in the back 4 and attached thereto as at 24. An adjusting screw 25 is provided at the free end of the strip 22, preferably outwardly beyond the backing plate portion 21 which is adjustable to limit the position of the backing plate 21 with respect to the land 7.

The paper backing-strip 26 is passed over rollers 27 at each end of the aperture 6 and across the aperture, the free end being attached to the take-up spool 44 at one end of the device. The take-up spool is adapted to be rotated through a take-up spool clutch 28 rotatably mounted in the side wall 3 (Fig. 8) as by a shaft 29 extending through a bore 30 in said side wall and provided with a film advancing knob 31 threadedly or otherwise attached as at 32 to the shaft 29. A spring 33 may be provided to maintain the clutch 28 in an inward position, for engagement of the take-up spool, so that the clutch may be pulled outwardly against the spring for the removal or insertion of a spool, according to common practice.

Figure 1:
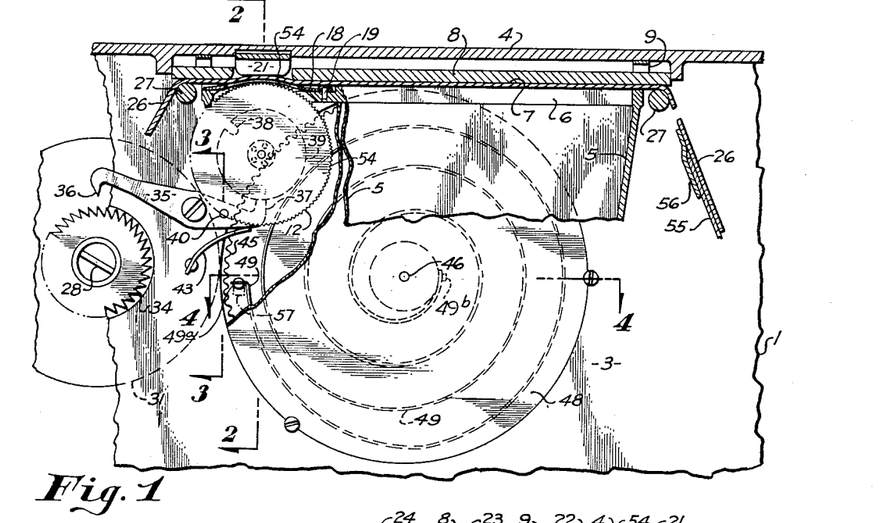
Fig. 1 is a fragmentary longitudinal section through a photographic camera incorporating my invention, showing a film backing-strip being passed through the picture aperture of the camera.

A ratchet 34 is provided at the position of the clutch 28 whereby rotation of the film advancing knob may be caused to be interrupted by operation of the metering mechanism, as through the agency of a pawl lever 35 pivotally carried on the side wall 3 and having a pawl member 36 on its outer end adapted to coact with the ratchet 34, and a detent 37 on its inner end adapted to coact with a notch 38 provided on a cam member 39 concentric with and preferably forming a part of the metering wheel 12. A manual release mechanism is provided for lifting the pawl out of the ratchet 34 when desired, which construction may comprise a release arm 40 mounted adjacent the inner end of the pawl lever 35 and extending through a passage 41 in a side wall 3 where it is engageable by a release member 42. The pawl lever 35 is preferably biased in a counterclockwise direction (Fig. 1) through the agency of a leaf spring 43, causing the detent 37 to ride on the cam 39 at the position of the metering wheel 12 which is illustrated in Fig. 1, and effective to force the detent 37 into the notch 38 upon rotation of the metering wheel to the position shown in Fig. 5. The release member 42 may be mounted for rotation about the axis of the shaft 29, as on a boss 44 projecting outwardly from the side wall 3, the rotary movement of the member 42 being sufficient to effect an amount of movement of the pawl lever 35 which is adequate to lift the pawl 36 out of the position of Fig. 5 into the position of Fig. 1.

Associated with the metering wheel 12 I provide a count wheel 45 pivotally mounted on the side wall 3 as at 46 as within a recess 47 in said side wall provided with a cover plate 48. A bias spring 49 is provided within the recess, which is anchored at one end 49a to the wheel 45 and at the other end to a hub portion which may be formed as a part of the cover plate 48, as at 49b, the bias spring extending spirally between the points of attachment in such direction as to bias the count wheel 45 towards rotation in a counter-clockwise direction as seen in Fig. 1. The count wheel 45 is advanced through successive film-exposure indicating positions through the agency of a gear member on the metering wheel 12, such as a lantern gear 50, which may be carried on a shaft portion 51 on said metering wheel. The ratio provided between the lantern gear 50 and count wheel 45 will depend upon the number of indicating positions desired on the count wheel 45. In the specific example shown I have provided a gear ratio such as to require 14 revolutions of the metering wheel 12 to effect one complete revolution of the count wheel 45, on the basis of providing for twelve exposure-indicating positions. As may be seen from Fig. 7, these positions are open to inspection by the user through a window 52 provided in the side wall 3, such positions being identified by indicia 53 on the face of the count wheel 45 which is exposed through such window.

Figure 2:
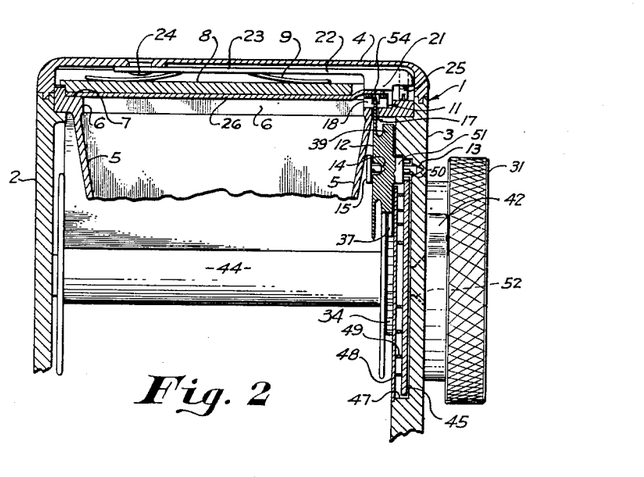
Fig. 2 is a transverse sectional view as taken on line 2—2 in Fig. 1.
Figure 3:
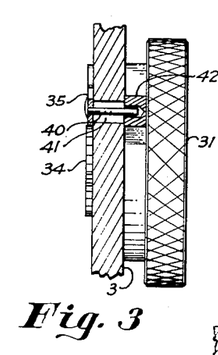
Fig. 3 is a fragmentary section as taken on line 3—3 in Fig. 1.
Figure 4:
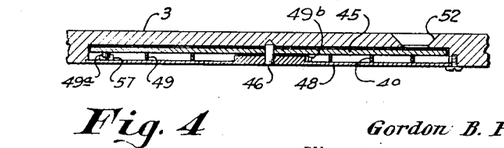
Fig. 4 is a fragmentary section as taken on line 4—4 in Fig. 1.

In the use of the construction, it will be assumed that the paper backing-strip will be placed in a position across the film aperture after the manner shown in Figs. 1 and 2 before the door 4 is closed. When the door is brought in closed position, the spring spacer 18, which normally is disposed above the level of the toothed-periphery 54 of the metering wheel 12, forces the edge of the paper backing-strip 26 outwardly against the backing plate 21, out of contact with the periphery 54 of the wheel 12. The spring 49, biasing the count wheel 45 toward the counter-clockwise position shown in Fig. 1, normally causes the metering wheel 12 to be disposed in the position of Fig. 1, it being understood that the wheel 12 is free to rotate to the indicated position (as hereinafter more particularly described), at which position the detent 37 rides on the cam 39 and renders the film-advancing locking means 34—36 inoperative. The operator may consequently freely rotate the knob 31, winding the backing strip 26 upon the take-up spool 44 preparatory to bringing the first film frame into position at the aperture 6.

Figure 5:
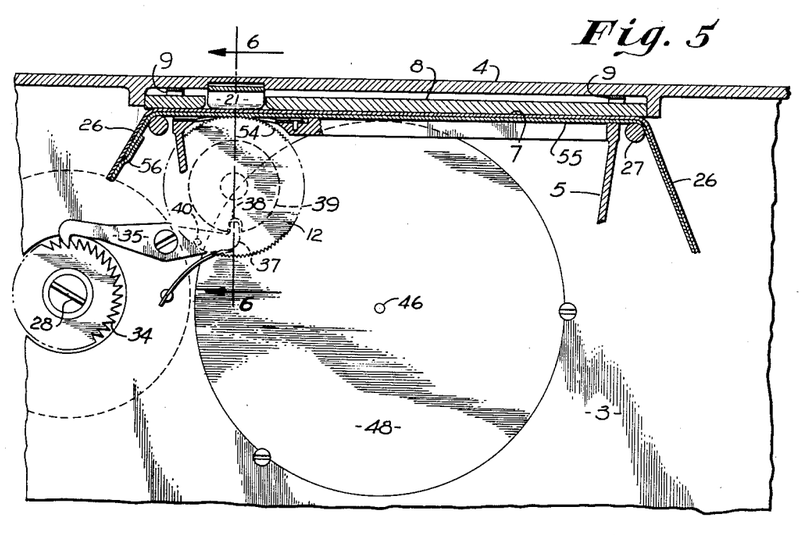
Fig. 5 is a view corresponding to Fig. 1, showing the film backing-strip rolled forwardly through the camera an amount sufficient to carry the photosensitive film-strip into the picture aperture.

The backing-strip 26 conventionally carries attached to it at its inner face a film-strip 55, normally through an attachment 56 comprising a strip of tape or the like adhesively secured to the strip 26 and the film 55. The combined layers of backing-strip 26 and film-strip 55 are brought across the aperture 6, forcing the pressure plate 8 outwardly and until the combined strips are brought into the passage between the toothed-periphery 54 and the backing plate member 21, the metering wheel 12 will remain inactive, the thickness of said space being established by proper positioning of the adjustment screw 25 to be greater than the thickness of the backing-strip 26 but less than the combined thickness of the backing-strip plus film. As soon as this additional thickness of material enters the aforesaid space, the spacer spring 18 will be forced downwardly past the periphery 54 of the wheel 12, and such periphery will be engaged by the film-strip 55 and caused to rotate in a counter-clockwise direction. As shown in Fig. 5 the wheel 12 has been rotated approximately 140° in a counter-clockwise direction from the position of Fig. 1, bringing the notch 38 in alinement with the detent 37, whereupon the pawl lever 35 is rotated counter-clockwise by the spring 43 to bring the pawl 36 into engagement with the ratchet 34. In this position the firm advancing knob 31 is immobilized, and the rotation of the metering wheel 12 will have produced a clockwise rotation of the count wheel 45, bringing the index "1" into viewing position behind the window 52 (see Fig. 7).

The above description of the operation would be precisely correct if the film-strip 55 were attached to the backing-strip 26 directly rather than through the agency of a taped member 56 as is the more common practice; actually, when the tape 56 enters the space between the metering wheel periphery 54 and the backing plate 21, the thickness of the strip 56 may be sufficient to engage the metering wheel 12 and start rotation thereof, before the film-strip 55 is actually located within this space. This is of little moment, and needs only to be considered in connection with the amount of movement which is permitted in the metering wheel 12 between the starting position of this wheel shown in Fig. 1 and the locking position thereof as shown in Fig. 2. Inasmuch as the thickness of the three layers formed by the attaching strip 56, the film-strip 55 and the backing-strip 26 is appreciably greater than the normal thickness of the material which is present in the space below the backing plate 21 during operation of the device, I preferably arrange the backing plate in such manner that it may be crowded away from the normal position defined by adjustment screw 25 to permit the thickened zone to pass through the space without crowding, and it is for this reason that I have shown the backing plate 21 as mounted on the resilient supporting strip 22 which is located in the slot 23 of the camera back 24. The spring action of the resilient strip 22 will be materially greater than the spring action of the spacer 18, so that the position of the backing plate 21 will normally be established by the adjustment of the screw 25.

After the desired exposure has been made, the next exposure frame is advanced by first releasing the pawl lever 35 to disengage the pawl 36 from the ratchet 34, which movement is effected by pushing in a clockwise direction on the lever 42 (Fig. 7), while maintaining a rotative effort upon the knob 31 so that as soon as the pawl 36 is released from the ratchet 34 rotation of the take-up spool is obtained. As soon as the take-up spool has moved the film forwardly even a minor amount, the resulting rotation of the metering wheel 12 will cause the detent 37 to ride upon the face of the cam 39, maintaining the pawl lever 35 in the position of Fig. 1 until the metering wheel 12 has made one full revolution. The detent 37 will then fall into the notch 38, repeating the locking operation. This one full revolution of the wheel 12 will advance the count wheel one indicating position, bringing the numeral "2" into viewing position behind the window 52. This operation is repeated as the successive photographic exposures are made, and as soon as the end of the film-strip 55 passes through the passage between the toothed-periphery 54 of the wheel 12 and the backing plate 21, the spring 49 will rotate the count wheel 45 in a counterclockwise direction and the metering wheel 12 in a clockwise direction, returning the wheels 45 and 12 to the position of Fig. 1. In order to insure this movement the spring 49 is preferably of sufficient strength to overcome the frictional drag of the detent 37 upon the cam 39. In order to stop the wheels 45—12 in the position of Fig. 1 I preferably provide cooperating stop members on the count wheel and some fixed portion of the structure, such as a stop 57 mounted on the recess cover 48 and adapted to engage the pin on the count wheel 45 which provides the attachment 45a (see Figs. 1 and 4).

The release of the metering wheel 12 results from the fact that as the end of the film-strip 55 is passed through the metering passage portion adjacent the toothed-periphery 54, the spring spacer 18 is then able to press the strip 26 upwardly against the backing plate 21, in which position the periphery 54 is disengaged, after the manner of the showing in Fig. 1. Upon release of the metering wheel in this fashion the user is provided with a three-fold signal that the film has passed through the photographic aperture, namely, a visual signal provided by the return of the count wheel 45 to the "zero" indicating position, a mechanical signal resulting from the release of the knob 31 for continued winding effort, and an audible signal resulting from the spring return of the count wheel and metering wheel to the normal or zero position.

Figures 6, 8, 9, 10, 11, 12, 13:
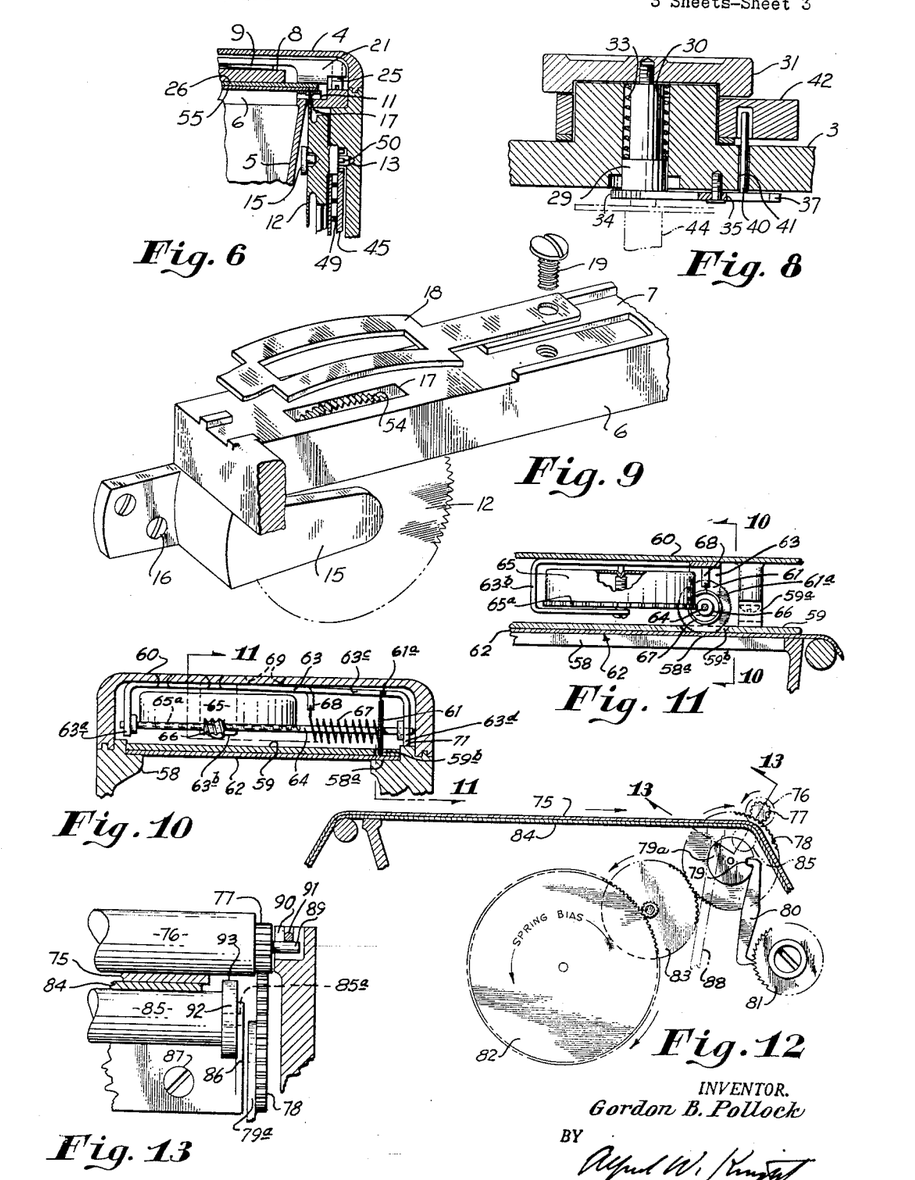
Fig. 6 is a fragmentary detail, in transverse section, as taken on line 6—6 in Fig. 5.
Fig. 8 is a sectional detail as taken on line 8—8 in Fig. 7.
Fig. 9 is an exploded perspective detail showing the sensor means which is adapted to engage the film-strip in the metering operation.
Fig. 10 is a fragmentary section corresponding generally to Fig. 6, showing a modification of the invention.
Fig. 11 is a transverse view thereof as taken on line 11—11 in Fig. 10, Fig. 10 being taken on line 10—10 in Fig. 11.
Fig. 12 is an internal sectional view, taken longitudinally of a camera structure incorporating a modified form of my invention, with the parts shown in cooperative relation in the substantial absence of supporting structure.
Fig. 13 is a fragmentary detail as taken on line 13—13 in Fig. 12.
Figure 7:
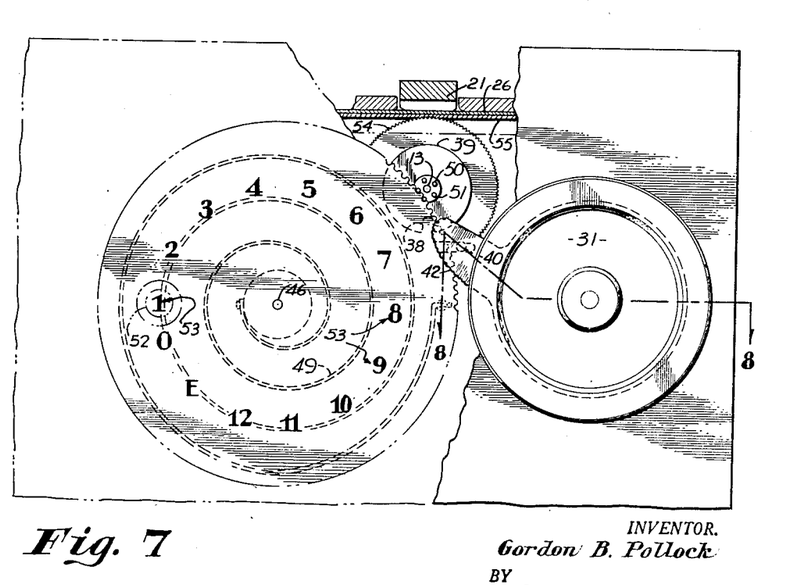
Fig. 7 is a broken-away side elevation of the structure.

In Figs. 10 and 11 I have illustrated a modification of my invention adapted to function directly upon the strip material being metered in its passage, as through a camera past a photographic aperture 58. A film pressure plate 59 is provided, which may be spring-supported from the camera back 60 as at 59a, and is provided with a slot 59b at an edge location through which a metering wheel 61 extends, such metering wheel being provided with a toothed-periphery 61a adapted to physically engage the strip material 62 under measurement. The wheel 61 is rotatably mounted upon a supporting cradle 63, attached to the camera back 60, the spacing of the wheel 61 from the adjacent film land portion 58a of the photographic aperture 58 being less than the thickness of the strip material 62 under measurement. The wheel 61 may carry a shaft 64 extending transversely across the camera toward the opposite side and there supported by a continuation 63a of the cradle 63. The count wheel 65 is provided, supported for rotation for example, on a transverse extension 63b of the cradle 63, and carrying a gear portion 65a adapted to be engaged by a worm 66 on the shaft 64 which is rotatable with the wheel 61. A return spring 67 is provided for the count wheel-metering wheel assembly, such as a helical spring wound about the shaft 64 and attached at one end to the wheel 61 and at the other end to a bracket member 68 formed on or from the cradle 63.

In the operation of the form of device shown in Figs. 10 and 11, the strip material 62 is placed in the passage defined between the land portion 58a and the wheel periphery 61a, and as the strip material is moved through this passage by advancing means not shown, the wheel 61 will rotate and produce an advancing movement of the count wheel 65, which will be provided with indicia means corresponding to that shown in the previously-described form of the invention, the indicia being observable by the user through the window indicated in dotted lines at 69 in Fig. 10. In this form of invention, no provision is made for the interruption of the strip-advancing means as the respective strip-lengths are brought into position, but such positions will be apparent through the window 69. When the strip 62 passes from beneath the wheel 61, the spring 67 returns the count wheel 65 to zero, as is the first-described form of device.

It will be noted that the showing in Figs. 10 and 11 illustrate but a single strip of material as being passed through the device; such a construction would be useful where bare film is employed in a camera, as is frequently done in the case of 35 mm. cameras. The count wheel not only shows the respective film-frame positions, but provides for the described automatic return to zero when the film has been exhausted. The provision of a sprocket at the peripheral edge 61a of the wheel 61 will be obvious where a perforated type of film is employed.

In view of the fact that the form of device shown in Figs. 10 and 11 is also useful where a roll-film of the type indicated in Fig. 1 is employed, I have shown the metering wheel 61 mounted for resilient movement out of the position shown in Figs. 10 and 11, to accommodate for the passage of the joint at which the film-strip is attached to the backing-strip. This resilient structure may be provided by mounting the cradle 63 upon the back 60 in a resilient fashion, as by attaching the cradle to the back 60 adjacent one edge of the back, as by rivets 70 (Fig. 10) and providing a resilient supporting portion 63c adjacent the mounting of the wheel 61, which portion is adapted for flexure in an upward direction away from the film-plane established at 58a, the worm 66 and the gear portion 65a being adaptable to the minor resulting angular movement of the shaft 64. The cradle 63 may be carried downwardly past the shaft 64 at the metering wheel end, as at 63d, where it may be brought into engagement with the adjacent edge 71 of the camera frame, to insure the desired spacing of the wheel periphery 61a from the land portion 58a, and this positioning means may readily be made adjustable after the manner of the first-described form of the invention in the event that the camera is adapted for use of strip materials of varied thickness, or, for example, for use of either bare film or roll film loads.

In Figs. 12 and 13 I have shown a metering mechanism more comparable to the first described form of the device but wherein the metering operation is carried out by contact with the back of the film backing-strip 75 as through a roller 76 extending across the width of the film and geared as at 77 to a cam wheel 78 carrying a notch 79 on a cam member 79a and corresponding to the notch 38, the notch 79 being adapted to coact with a cam lever 80 and a ratchet 81 on the film advancing means. The cam gear 78, in this form of the device is intended to undergo one full revolution as a result of six turns of the roller 76, and the count wheel 82 is preferably geared down as by an intermediate gear 83 so that the desired advancement of one film-position indication is secured for each full revolution of the cam wheel 78. Means will be provided for release of the lever 80 when the desired film advancing movement is desired, such as is provided in the first form of the invention as an example. The roller 76 is adapted to engage the backing-strip 75 only when a film-strip 84 is also present adjacent the roller 76, and in order to establish the desired measuring space adjacent the roller 76 I may utilize an idling roller 85 disposed at a position level with the film aperture plane, the spacing of the periphery of the roller 76 from the normal position of the strip locating roller 85 being greater than the thickness of the backing-strip 75 but less than the thickness of the combined strips 75 and 84. In order that the attachment joint (comparable to that shown in Figs. 1 and 5, but not shown in Fig. 12) may freely pass through the metering passing between the rollers 76 and 85, the roller 76 is preferably mounted for movement away from the roller 85. The roller 85 may be provided with projecting shaft portions 85a rotatably mounted on the camera body through the agency of a bracket 86 and screws 87, as upon the side of the "bellows" member shown in dot-dash lines at 88. The roller 76 may be provided with projecting shaft portions 89 at the respective ends thereof, which may ride in a slot 90 in the side wall portion of the structure, and biased toward the position of the roller 85 through the agency of a spring arm indicated in section at 91 in Fig. 13. In order to limit the amount of movement of the roller 76 toward the roller 85 in the absence of the two strips 75 and 84, I preferably provide short idling rollers 92 rotatably carried on the shaft portions 85a at the respective ends of the roller 85, of such diameter as to present a peripheral surface 93 which will engage the roller 76 and space the same from the periphery of the roller 85 an amount in excess of the thickness of the film-strip 84, but less than the combined thickness of the strips 75 and 84. It will be appreciated that the roller 85 will be subjected to rotation as long as the strip 75 is present in position to be moved through the camera in contact with such roller, wherefore the short spacing rollers 92 must be freely rotatable with respect to the roller 85 so that rotation of the roller 85 solely by the strip 75 will not effect an unwanted rotation of the metering roller 76.

The operation of this form of the device is entirely comparable to the first described form of the invention, it being appreciated that biasing means will be provided for normally urging the count wheel 82 in the direction of the feathered arrow (Fig. 12) counter to the direction of movement resulting during the metering operation, such direction being indicated by the tailless arrows.

This last-described form of the invention is adaptable to the metering of strips of varied width, inasmuch as no engagement of the strip at the edge portion is required, the roller 76 being extended across the width of the strip in position to engage any strip of sufficient thickness present in the space between the roller 76 and the opposing guide-roller 85.

The dimensions of the film-thickness, paper backing thickness, etc., have deliberately been exaggerated in the accompanying drawings, for the purpose of clarity, and it will be appreciated that this exaggeration is employed to emphasize the different levels of materials present in the metering passage or space. Furthermore, while I have shown the edge 54 of the metering wheel 12 and the edge 61a of the metering wheel 61 as located a slight amount rearwardly of the focal plane of the camera as defined by the lands 7 and 58a, it will be appreciated that for photographic use the location of this engaging edge portion may be disposed at any convenient position substantially in or relatively close (either forwardly or rearwardly) to the plane of the film in the photographic or picture-taking aperture, so that the film is not deformed out of the focal plane such an amount as to be detrimental to the photographic results desired. Where the sensor means is located away from the picture-taking aperture, as in the form shown in Figs. 12 and 13, the location of the metering roller means with reference to the focal plane is, of course, irrelevant.

Other modifications of my device will occur to those skilled in the art wherefore I do not choose to be limited to the precise details herein delineated and described, but rather to the scope of the subjoined claims. For example, while I have described the first and third forms of my invention as being useful where the film-strip is provided with a protective backing-strip or layer, it will be apparent that these forms of device are also useful in structures where this protective or backing layer is omitted, after the manner of the form shown in Figs. 10 and 11, in which case the spacing of the metering members 12 and 76 from the associated relatively fixed guiding and thickness-sensing portion of the structure at which the metering action takes place will be such as to be less than the thickness of the strip under measurement so that the operation of the metering wheel or roller will take place upon movement of the strip through such space. The metering action would consequently start as soon as the mechanism is closed, with no free strip advancement up to the first usable film position, but the desired counting of the successive strip positions would result so long as the strip is present. The spring return of the metering mechanism to the zero position would result when the strip is withdrawn from the metering space, and certain of the advantages of the invention would therefore be realized.

I claim:

1. In a device for moving longitudinally a strip having a relatively thick portion and a relatively thin portion, means for measuring the movement of only the relatively thick portion of the strip, comprising: means defining a passage for longitudinal movement of the strip; a strip locating member positioned to engage one surface of a strip in said passage and thereby establish said one surface at a given location; and a metering roller disposed opposite said strip locating member and having its periphery so spaced from said member as to be frictionally engaged and rotated by the other surface of said strip when the relatively thick portion of the strip is moved between said member and said roller; the spacing of said roller from said strip locating member being greater than the thickness of the relatively thin portion of said strip so that the periphery of the roller is free from engagement by said other surface of the strip when said relatively thin portion is interposed between the strip locating member and the roller.

2. A construction as set forth in claim 1 and also comprising: means for moving the strip longitudinally through said passage; locking means operable in response to a predetermined amount of rotation of said metering roller, to inactivate said strip moving means and thereby interrupt movement of the strip at successive longitudinal positions thereof; and spring means biasing said metering roller toward rotation in the direction opposite the direction of rotation caused by frictional engagement of the strip, said spring means being operable to return said roller to an inoperative position with respect to said locking means upon termination of frictional engagement of the strip with said roller.

3. A construction as set forth in claim 1 and also comprising: rotatable counter means operatively connected to said metering roller and operable thereby from an initial position to different positions upon successive longitudinal movements of the relatively thick portion of the strip; and spring means biasing said counter means toward return movement from said different positions to said initial position, said spring means being operable to effect such return movement to said initial position upon termination of frictional engagement of the strip with said roller.

4. A construction as set forth in claim 1 and also comprising means engaging said strip to constrain said one surface of the strip in engagement with said strip locating member during longitudinal movement of the strip through said passage, and to thereby constrain said relatively thin portion of the strip out of engagement with said metering roller.

5. In a device for moving a strip of material in a longitudinal manner through successive longitudinal positions, and for maintaining an indication of the number of such positions to which said strip has been moved, the combination which comprises: guide means establishing a passage portion through which said strip is to be moved; a metering roller member located adjacent said passage portion and adapted to engage such a strip present therein, said metering roller being freely rotatable in the absence of such a strip in said passage, and being rotatably constrained by engagement with such a strip, whereby said roller member is rotated by said strip in response to movement thereof through said passage portion and is constrained to immobility by said strip when said strip is static in said passage portion; rotatable counter means operatively associated with said roller member and provided with indicia means for indicating such successive positions upon rotation of said counter means to a plurality of successive indicating positions in one direction by said metering roller member; spring means biasing said counter means and said roller member towards rotation in the opposite direction to a normal starting position, and adapted to rotate said counter means and member to said normal starting position from any one of such plurality of indicating positions of said counter means upon movement of such strip out of said passage and away from constraining engagement with said roller member; means for moving said strip longitudinally through said passage portion; and locking means operatively associated with said moving means and with said roller member, said locking means including means for immobilizing said moving means upon rotation of said roller member to a given rotative position other than said normal starting position and for disassociating said locking means from said moving means at other rotative positions of said roller member.

6. In a device for moving a strip of material in a longitudinal manner through successive longitudinal positions, and for maintaining an indication of the number of such positions to which said strip has been moved, the combination which comprises: guide means establishing a passage portion through which said strip is to be moved; a metering roller member located adjacent said passage portion and adapted to engage such a strip present therein, said metering roller being freely rotatable in the absence of such a strip in said passage, and being rotatably constrained by engagement with such a strip, whereby said roller member is rotated by said strip in response to movement thereof through said passage portion and is constrained to immobility by said strip when said strip is static in said passage portion; rotatable counter means operatively associated with said roller member and provided with indicia means for indicating such successive positions upon rotation of said counter means to a plurality of successive indicating positions in one direction by said metering roller member; spring means biasing said counter means and said roller member towards rotation in the opposite direction to a normal starting position, and adapted to rotate said counter means and member to said normal starting position from any one of such plurality of indicating positions of said counter means upon movement of such strip out of said passage and away from constraining engagement with said roller member; means for moving said strip longitudinally through said passage portion; and locking means operatively associated with said moving means and with said roller member, said locking means including means for immobilizing said moving means upon rotation of said roller member to a given rotative position other than said normal starting position and for disassociating said locking means from said moving means at all other rotative positions of said roller member, and the indicating positions of said counter means corresponding respectively to said given rotative position of said roller member.

7. In a photographic camera device adapted to utilize a roll film and provided with an exposure frame indexing and counting mechanism operative to frame such film in progressive picture-taking positions at a given exposure aperture, a control member operatively associated with said mechanism and including a metering roller member located adjacent said aperture and positioned to peripherally engage such roll film during the presence thereof at said exposure aperture and operative to control said mechanism so long as contact between said film and said roller member is maintained, and to release control of said mechanism in the absence of such contact; a counter member rotatively associated with said roller member and provided with indicia means for indicating such progressive picture-taking positions of said film; and spring means biasing said counter means and said roller member to a normal statrting position, and adapted to return said counter means and member to said normal starting position upon passage of the end of such film past said aperture and away from contact with said roller member.

8. In a photographic camera device adapted to utilize a roll film having a backing-strip and a strip of photosensitive film material adapted to concurrently be moved through such camera, and provided with an exposure frame and indexing counting mechanism and operative to frame such film in progressive picture taking positions at a given exposure aperture, the combination which comprises: means defining a passage adapted to receive said strips during the travel thereof through said camera; a rotatable metering member operatively associated with said indexing and counting mechanism positioned for engagement and rotation by one of said strips when both of said strips are present in said passage; and spacer means located in said passage adjacent the position of said metering member and adapted to engage said backing strip and positively constrain the same out of contact with said metering member during movement of said backing strip through said passage in the absence of said film strip.

9. In a photographic camera device adapted to utilize a roll film having a backing-strip and a strip of photosensitive film material adapted to concurrently be moved through such camera, the combination which comprises: film-advancing means for producing such movement and including a rotatable element adapted for engagement with a film take-up spool; means defining a passage adapted to receive said strips during the travel thereof through said camera; a rotatable metering member positioned for engagement and rotation by one of said strips when both of said strips are present in said passage; a count wheel rotatably associated with said metering member and adapted to be rotatably advanced from a zero position through successive film-frame indicating positions upon rotation of said metering member; spring means biasing said count wheel to said zero position; detent means associated with said metering member and said rotatable element of said film advancing means and operative to engage said rotatable element and constrain the same against rotation when said metering member is in a rotative position corresponding to any one of said film-frame indicating positions of said count wheel; and spacing means located in said passage adjacent the position of said metering member, and adapted to engage said backing-strip and constrain the same out of contact with said metering member in the absence of said film-strip.

10. A construction as set forth in claim 9, said combination including a manually operable release member associated with said detent means and movable to effect release of said detent means for manual operation of said film advancing means.

11. In a photographic camera device adapted to utilize a roll film having a backing-strip and a strip of photosensitive film material adapted to concurrently be moved through such camera, the combination which comprises: film-advancing means for producing such movement and including a rotatable element adapted for engagement with a film take-up spool; means defining a passage adapted to receive said strips during the travel thereof through said camera; a rotatable metering member positioned for engagement and rotation by one of said strips when both of said strips are present in said passage; a count wheel constrained to rotation with said metering member and adapted to be rotatably advanced from a zero position through successive film-frame indicating positions upon rotation of said metering member; spring means biasing said count wheel to said zero position; detent means for locking said rotatable element of said film-advancing means; and cam means on said metering member cooperating with said detent means to hold the same out of locking position at all positions of said metering member other than a position corresponding to a film-frame indicating position of said count wheel.

12. In a device for measuring a length of strip material which is movable longitudinally through such device in the measuring operation, the combination which comprises: a metering roller member adapted for peripheral engagement with such a strip of material at one face thereof, a guide member positioned in spaced relation to the periphery of said roller member in position to crowd said strip into such peripheral engagement only when the thickness of such strip is not less than the spacing of said guide member from said periphery, and a spacer member positioned adjacent said roller member to engage any strip of material disposed in the space between said roller and said guide means which is less thick than such spacing, to crowd such strip away from and maintain such a less thick strip out of contact with said metering roller member.

13. In a device for measuring the length of strip material which is movable longitudinally through such device in the measuring operation, the combination which comprises: a metering roller member adapted for peripheral engagement with such a strip of material at one face thereof, a guide member positioned in spaced relation to the periphery of said roller member in position to crowd said strip into such peripheral engagement only when the thickness of such strip is not less than the spacing of said guide member from said periphery, and a resiliently disposed spacer member positioned adjacent said roller member and having a portion resiliently urged toward said guide member in position to engage any strip of material disposed in the space between said roller and said guide means which is less than such spacing, to maintain such a strip out of contact with said metering roller member, and being resiliently movable away from said guide member under the influence of a strip of material of greater thickness.

14. In a device for measuring a length of strip material which is movable longitudinally through such device in the measuring operation, the combination which comprises: a metering roller member adapted for peripheral engagement with such a strip of material at one face thereof, a guide member positioned in spaced relation to the periphery of said roller member in position to engage such strip at the opposite face thereof and crowd said strip into such peripheral engagement only when the thickness of such strip is not less than the spacing of said guide member from said periphery, and a resiliently disposed spacer member positioned adjacent said roller member and having a portion resiliently urged toward said guide member in position to engage any strip of material disposed in the space between said roller and said guide means which is less than such spacing, to maintain such a strip out of contact with said metering roller member, and being resiliently movable away from said guide member under the influence of a strip of material of greater thickness, said guide member being resiliently biased toward the position of spaced relation and resiliently movable out of said position in the direction away from said roller member, the resilient urging of said spacer member portion being of less force than the resilient bias of said guide member, and the combination including adjustment means for defining said position.

15. In a camera adapted to utilize a roll film including superimposed photosensitive film and backing strips, a device for metering successive frames of said photosensitive film strip, which comprises: a metering roller adapted for peripheral engagement with one surface of said roll film; a guide member normally positioned in spaced relation to the periphery of said roller at a spacing greater than the thickness of such backing-strip but less than the combined thickness of said film and backing strips; means defining a passage for movement of said roll film between said roller and said guide member; and means engaging said roll film and constraining the other surface thereof into contact with said guide member during movement of said roll film through said passage, and thereby constraining said one surface out of engagement with said roller when the backing strip alone is present between said roller and said guide member; said roller being positioned for frictional engagement and rotation by said one surface of the roll film when both said film and backing strips are moved between said roller and said guide member.

GORDON B. POLLOCK.

REFERENCES CITED

The following references are of record in the file of this patent:

UNITED STATES PATENTS

| Number | Name | Date |
|---|---|---|
| 154,895 | Palmer | Sept. 8, 1874 |
| 1,249,941 | Feild | Dec. 11, 1917 |
| 1,448,414 | Mietzelfeld | Mar. 13, 1923 |
| 1,539,489 | Hughes et al. | May 26, 1925 |
| 1,946,855 | Horns | Feb. 13, 1934 |
| 2,016,611 | Muller | Oct. 8, 1935 |
| 2,132,680 | Crumrine | Oct. 11, 1938 |
| 2,148,636 | Muller et al. | Feb. 28, 1939 |
| 2,275,791 | Mihalyi | Mar. 10, 1942 |

FOREIGN PATENTS

| Number | Country | Date |
|---|---|---|
| 616,006 | Germany | July 17, 1935 |